J. H. MARTIN.
CURRENT MOTOR.
APPLICATION FILED OCT. 23, 1909.
982,154.
Patented Jan. 17, 1911.
3 SHEETS—SHEET 1.
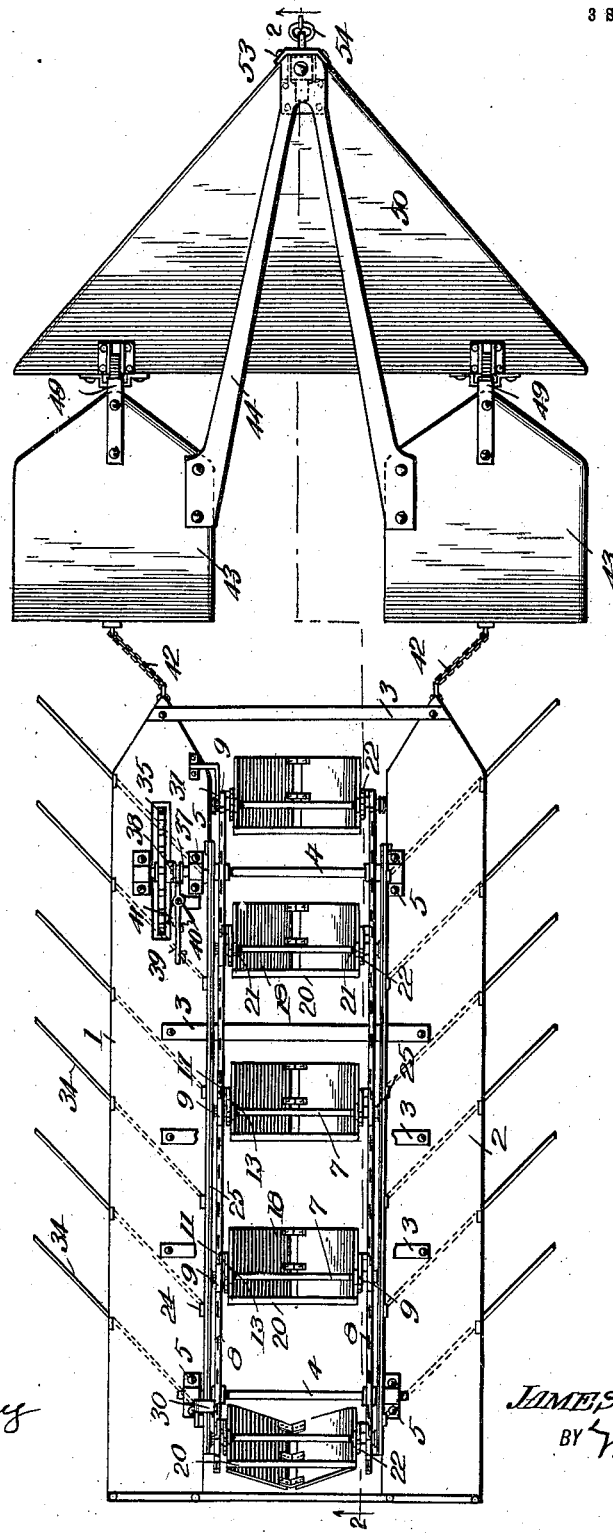
WITNESSES
INVENTOR
JAMES H. MARTIN
BY
ATTORNEYS J. H. MARTIN.
CURRENT MOTOR.
APPLICATION FILED OCT. 23, 1909.
982,154.
Patented Jan. 17, 1911.
3 SHEETS—SHEET 2.
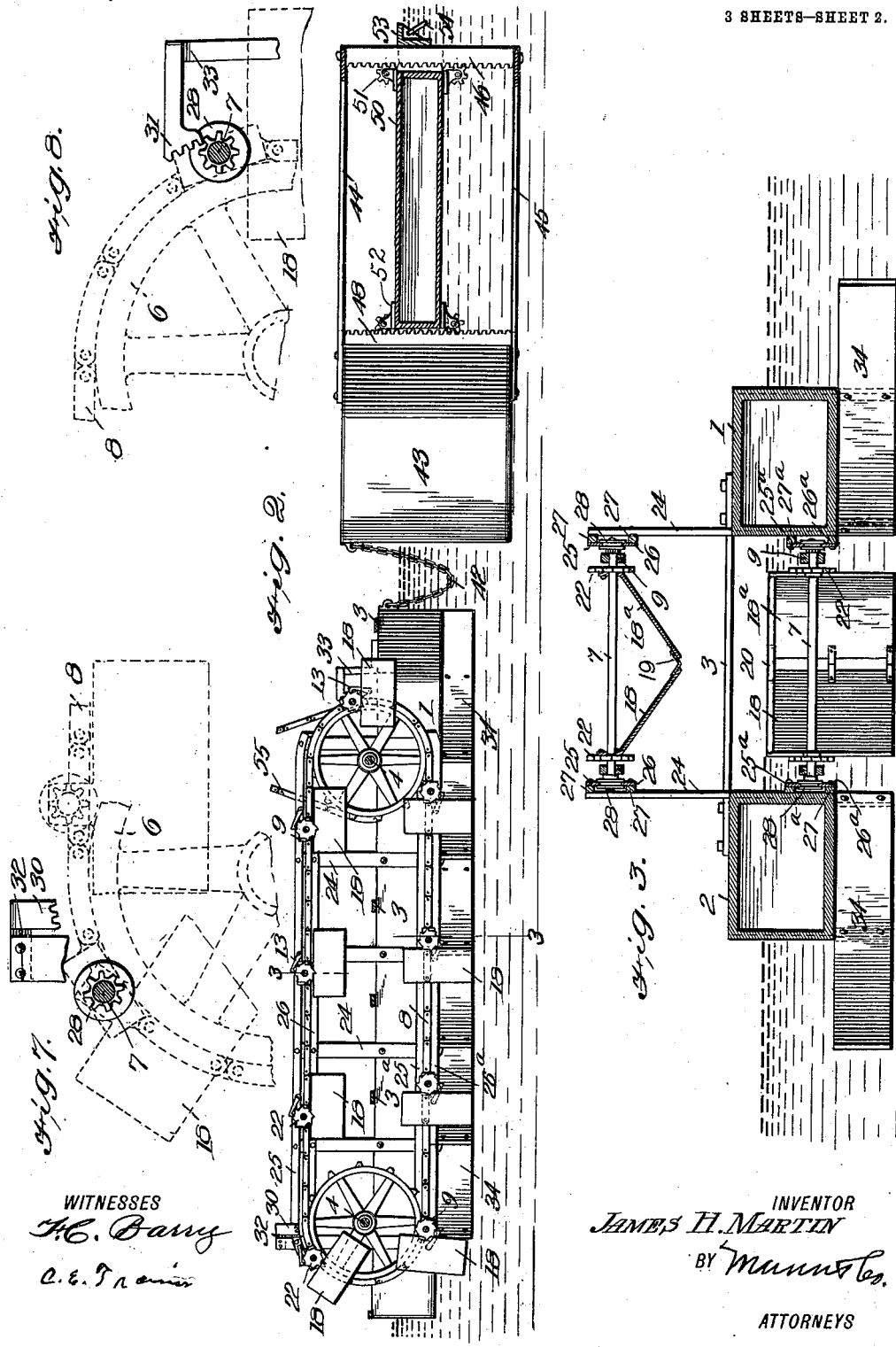
WITNESSES
INVENTOR
JAMES H. MARTIN
BY
ATTORNEYS J. H. MARTIN.
CURRENT MOTOR.
APPLICATION FILED OCT. 23, 1909.
982,154.
Patented Jan. 17, 1911.
3 SHEETS—SHEET 3.
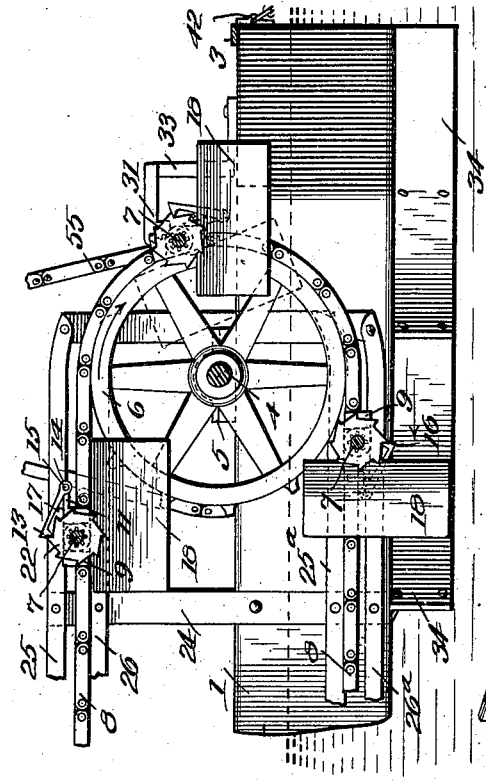
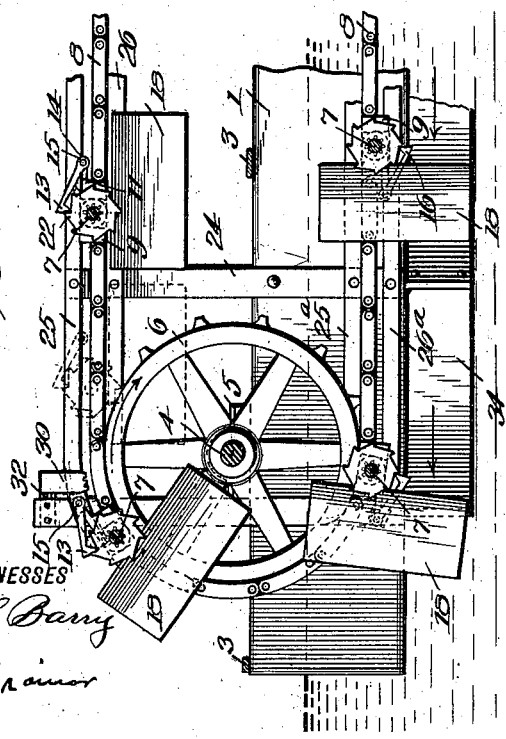
WITNESSES
INVENTOR
JAMES H. MARTIN
BY
ATTORNEYS

UNITED STATES PATENT OFFICE.

JAMES H. MARTIN, OF SPRINGFIELD, MISSOURI.

CURRENT-MOTOR.

982,154. Specification of Letters Patent. Patented Jan. 17, 1911.

Application filed October 23, 1909. Serial No. 524,127.

*To all whom it may concern:*

Be it known that I, JAMES H. MARTIN, a citizen of the United States, and a resident of Springfield, in the county of Greene, State of Missouri, have invented certain new and useful Improvements in Current-Motors, of which the following is a specification.

My invention is an improvement in current motors, and consists in certain novel constructions and combinations of parts hereinafter described and claimed.

The object of the invention is to provide a motor of the character specified adapted to be partially submerged in a running stream, which will deliver a maximum of power, and which will retain its partially submerged position regardless of the depth of the water.

Referring to the drawings forming a part hereof: Figure 1 is a plan view of the improvement; Fig. 2 is a section on the line 2—2 of Fig. 1, looking in the direction of the arrow; Fig. 3 is a section on the line 3—3 of Fig. 2; Fig. 4 is an enlarged view of one end of Fig. 2; Fig. 5 is a similar view of the other end; Fig. 6 is a perspective view of a link of the carrier; Fig. 7 is a detail sectional view of a portion of the blade swinging mechanism at one end of the carrier; and Fig. 8 is a similar view of the swinging mechanism at the other end.

The embodiment of the invention shown in the drawings comprises a float which is composed of a pair of parallel spaced boats 1 and 2, which are connected together in spaced relation by cross bars 3. Each boat is provided near each end with a bearing 5, and a shaft 4 is journaled in the bearings at each end, the shaft extending across the space between the boats. A sprocket wheel 6 is secured to each shaft near each end thereof, and a sprocket chain to be presently described connects the wheels on each side of the space, and the said chains are connected together at spaced intervals by shafts or rods 7, upon which are secured the blades or vanes. Each of the chains is composed of links 8, and at spaced intervals blocks 9 are interposed in the chain between the links, and the shafts 7 before mentioned are journaled in registering blocks of the two chains and extend across the space between the chains. Each block is provided at its ends with perforated lugs 10, to which the adjacent links of the chain are pivoted and with a longitudinally extending arm 11. Each arm 11 is provided with a bearing 12, and a pawl 13 is provided with a similar bearing 14 registering therewith, and a pivot pin 15 extends through the bearings to connect the pawl with the arm. Each pawl is provided with a tooth 16, and a spring 17 presses the pawl toward the arm.

Each of the blades or vanes consists of two plates or leaves 18, 18ᵃ arranged at an angle with respect to each other, and connected together at their adjacent edges by angle plates 19, and at their remote edges by cross straps 20. Each leaf is provided on its outer edge with a lug 21 and a ratchet wheel 22 is riveted to the lug by rivets 23. The ratchet wheel is provided with a central opening, and the lug with an opening registering therewith, and the shaft 7 extends through the openings. It will be understood that the lug of each leaf of the vane is provided with a ratchet wheel, and that the pawl on the adjacent block coöperates with the said wheel. The lugs 21 are nearer the upper end of the float than the lower, so that the float normally takes an approximate vertical position.

A series of standards 24 is secured to each of the boats at spaced intervals, and a track, comprising upper and lower rails 25 and 26, is supported at the top of each series of the standards, the rails being spaced inwardly from the standards by blocks 27, and the ends of the shafts 7 are extended outside of the blocks 9, and are provided with grooved wheels 28 which run between the rails. A track is also arranged on the inner face of each boat near the bottom thereof, the said tracks being horizontal and consisting of similar rails 25ᵃ, 26ᵃ spaced from the boat sides by blocks 27ᵃ, and the rails are engaged in like manner by the wheels 28. Near their ends the tracks curve toward each other as shown in Figs. 4 and 5, the curve being concentric with the adjacent shaft 4. Each of the shafts 7 is also provided at one end, and between the roller 28 and the block 9, with a pinion 29 secured to the shaft, and each of the said pinions is adapted to be engaged twice during each complete revolution with a rack 30 and 31, one at one end of the float and the other at the other end (Figs. 7 and 8). The rack 30 is supported by a bracket 32 on the adjacent standard 24, and depends from the bracket in position for engaging each pinion as it passes, while the rack 31 extends laterally from a bracket 33 at the opposite end of the float.

Each of the boats is provided on its bottom with parallel deflectors 34 which extend beyond the boats on each side and deflect the water inwardly toward the central space and into contact with the blades of the carrier.

The forward shaft 4 is extended beyond the bearing on the boat 1, and is provided with a sprocket wheel 35, from which power may be taken by any suitable mechanism. The sprocket wheel is loose on the shaft, and its hub 36 is provided with clutch teeth which coöperate with other teeth on a sleeve 37 keyed to the shaft but slidable longitudinally thereof. The sleeve is provided with an annular groove which is engaged by a fork 38 on a lever 39 pivoted, as at 40, on the boat, and the lever is provided with a tooth which coöperates with a toothed quadrant 41 for locking the lever in adjusted position. It will be evident that by swinging the lever the sprocket wheel may be clutched to or from the shaft.

A buoy is arranged in front of the float, and the float is connected thereto by chains 42, one leading from each boat, and the buoy consists of spaced members 43 whose front ends are pointed, as shown in Fig. 1. A pair of substantially U-shaped brackets 44, 45 connects the members together, the brackets being connected with the upper and lower faces of the members and extending forwardly in a horizontal direction. Each bracket has one arm connected with one member 43 and the other with the other member, and the forward ends of the brackets are connected by a rack bar 46. A similar rack bar 48 and 49 is supported on the pointed front end of each member of the buoy, and a deflector 50, triangular in shape, is arranged in front of the buoy. The said deflector is of comparatively slight depth and is arranged with its base toward the buoy and with its apex adjacent to the rack bar. A pair of pinions 51 is journaled on the deflector adjacent to each rack bar in a bracket 52, one bracket being secured to the upper face of the deflector and the other to the lower face. The deflector is hollow, as shown in Fig. 2, and remains on the surface of the water at all times. Each pair of pinions 51 engages the adjacent rack bar and moves therealong when the deflector rises and falls with respect to the buoy. bracket 53 is secured to the front of the ra bar 46, and a ring 54 is connected with t bracket. The buoy is preferably anchor to the bottom of the stream by any suitab flexible connection, engaging the ring, a the said connection should be of such leng that the buoy may rise with the water wit out straining the connection.

In the use of the device it is supported the stream by means of the ring 54, a with the said ring up stream. Driftwoc and the like is deflected to the sides by tl deflector 50, which is on the surface ar does not interfere with the current whic passes between the members 43 of the buc and into contact with the blades or van 18, 18ª. As the current of water strikes tl vanes they are moved longitudinally ther by, thus moving the chains and turning tl shafts 4. As the vanes move along the low run of the carrier, the force of the currer tends to hold them in vertical position, an when they are lifted from the water at tl rear end of the float, as shown in Fig. 4, tl pawls act to prevent further clockwis swinging movement. As the vanes pass ont the upper run, the center of gravity, bein below the shaft 7, tends to swing the van and ratchet wheel away from the pawls an each blade as it passes around the whee would be inverted, and, if permitted to d so, would pass along the upper vane of th carrier in such position. It is not desirabl however, that they should do this, and th rack 30 is provided to swing each blade little farther and bring it into horizonta position. The rack is only long enough fo this purpose, and as soon as the blades swin; with their long axis horizontal the pinio passes off the rack. At the opposite end o the float each vane is given another quarte turn by the rack 31, and in a similar man ner, so that each vane enters the water in : substantially vertical position, as indicatec in Fig. 5.

The engagement of the grooved wheel on the ends of the shafts 7 with the track retains the upper and lower run of th chains horizontal, and insures that each van will be entirely submerged when on th lower run and will be entirely out of th water on the upper run. A chain belt 5 leads from the sprocket wheel 35 and ma connect with any suitable mechanism fo utilizing the power.

I claim:

1. A device of the character specified comprising a float composed of a pair o boats arranged in spaced and parallel relation, a shaft journaled transversely of the boats near each end thereof, a sprocket wheel near each end of each shaft, and in the space between the boats, a sprocket chain connecting the corresponding wheels at each side of the boat, each of said chains comprising a plurality of links, and blocks interposed between the links at spaced intervals, the blocks of one chain registering with the blocks of the other chain, a shaft journaled in each pair of registering blocks, a blade or vane secured on each shaft, the shaft being nearer the upper end of the blade, a ratchet wheel on each end of each shaft and secured to the blade, a pawl on each block for coöperating with the adjacent ratchet wheel, a spring pressing the pawl toward the wheel, said shafts being extended beyond the blocks, a grooved wheel on each end of the shaft outside of the block, fixed tracks supported by the boats for engagement by the wheel, a pinion on each shaft, and a fixed rack at each end of the float and in position for engagement by the pinions, for the purpose specified.

2. In a device of the character specified, a pair of spaced parallel boats, a shaft journaled on the boats near each end and extending across the space between them, a sprocket chain on the corresponding wheels at each side of the space between the boats, blocks interposed in said chains at spaced intervals, the blocks of one chain registering with the blocks of the other chain, a shaft journaled in each pair of registering blocks, a blade or vane secured on each shaft, the shaft being nearer the upper end of the blade, a ratchet wheel on each end of each shaft and secured to the blade, a pawl on each block for coöperating with the adjacent ratchet wheel, a spring pressing the pawl toward the wheel, said shafts being extended beyond the blocks, a grooved wheel on each end of the shaft outside of the block, fixed tracks supported by the boats for engagement by the wheels, a pinion on each shaft, and a fixed rack at each end of the float and in position for engagement by the pinions, for the purpose specified.

3. In a device of the character specified, a float comprising a pair of spaced parallel boats, an endless carrier supported near each boat on the inner side thereof, blocks interposed in said carriers at spaced intervals, the blocks of one chain registering with the blocks of the other chain, a shaft journaled in each pair of registering blocks, a blade or vane secured on each shaft, the shaft being nearer the upper end of the blade, a ratchet wheel on each end of each shaft and secured to the blade, a pawl on each block for coöperating with the adjacent ratchet wheel, a spring pressing the pawl toward the wheel, said shafts being extended beyond the blocks, a grooved wheel on each end of the shaft outside of the block, fixed tracks supported by the boats for engagement by the wheels, a pinion on each shaft, and a fixed rack at each end of the float and in position for engagement by the pinions, for the purpose specified.

4. In a device of the character specified, a float comprising a pair of spaced parallel boats, an endless carrier between the boats and running longitudinally thereof, shafts journaled transversely of the carrier at spaced intervals, a blade or vane secured on each shaft and having its center of gravity below the shaft, a ratchet wheel on the shaft and secured to the blade, a spring pressed pawl on the carrier engaging the wheel, a pinion on each shaft, and a fixed rack at each end of the float for engagement by the pinions, for the purpose specified.

5. In a device of the character specified, a float, an endless carrier mounted for movement thereon, shafts journaled transversely of the carrier at spaced intervals, a vane secured on each shaft and having its center of gravity below the shaft, a ratchet wheel on each shaft and secured to the vane, a pawl on the carrier engaging the wheel, a pinion on each shaft, and a fixed rack near each end of the carrier for engagement by the pinions, for the purpose specified.

6. In a device of the character specified, a float comprising spaced parallel boats, an endless carrier mounted for movement between the boats, a buoy comprising spaced members with which the float is connected, and a deflector in front of the buoy, said deflector comprising a hollow body triangular in cross section and arranged with its base toward the buoy, a vertical rack bar on each member of the buoy, brackets extending in front of the buoy and connected thereto, a vertical rack bar supported by the brackets, said deflector being between the rack bars, and pinions journaled on the deflector and engaging the said bars.

7. In a device of the character specified, a float comprising spaced parallel boats, an endless carrier mounted for movement between the boats, a buoy comprising spaced members with which the float is connected, and a deflector in front of the buoy, said deflector comprising a hollow body triangular in cross section and arranged with its base toward the buoy, and a vertical guideway for the deflector connected with the buoy.

8. In a device of the character specified, a float comprising spaced parallel boats, an endless carrier mounted for movement between the boats, a buoy comprising spaced members with which the float is connected, and a deflector in front of the buoy, said deflector comprising a hollow body substantially triangular in cross section and arranged with its base to the buoy.

9. In a device of the character specified, a deflector comprising a buoyant body substantially triangular in cross section, a buoy provided with spaced rack bars between which the deflector is received, and pinions on the deflector for engaging the bars.

10. In a device of the character specified, a deflector comprising a buoyant body substantially triangular in cross section, a buoy provided with a vertical guideway in which the deflector is movable.

JAMES H. MARTIN.

Witnesses:
C. E. TRAINOR,
SOLON C. KEMON.